United States Patent [19]
Haller et al.

[11] Patent Number: 5,928,319
[45] Date of Patent: Jul. 27, 1999

[54] COMBINED BINARY/DECIMAL ADDER UNIT

[75] Inventors: Wilhelm Haller, Remshalden; Ulrich Krauch, Dettenhausen; Thomas Ludwig, Sindelfingen; Holger Wetter, Böblingen, all of Germany

[73] Assignee: International Business Machines Corporation, Armonk, N.Y.

[21] Appl. No.: 08/969,244

[22] Filed: Nov. 13, 1997

[30] Foreign Application Priority Data

Nov. 7, 1997 [EP] European Pat. Off. .............. 97119479

[51] Int. Cl.$^6$ ...................................... G06F 7/50
[52] U.S. Cl. ............................................ 708/673
[58] Field of Search .................... 364/771, 772; 708/673, 674

[56] References Cited

U.S. PATENT DOCUMENTS 5,007,010 4/1991 Flora ........................................ 364/771
5,146,423 9/1992 Fischer et al. ........................... 364/771
5,745,399 4/1998 Eaton et al. ............................. 364/771

*Primary Examiner*—David H. Malzahn
*Attorney, Agent, or Firm*—Marc A. Ehrlich

[57] ABSTRACT

A combined binary/decimal adder unit reduces the operation delay ine processing binary coded decimal operands and permit an increased cycle rate of a processor unit in which the combined binary/decimal adder unit is utilized. Pre-sums are generated for each decimal digit position in parallel to the generation and distribution of the carries over the total of decimal digit positions of the adder unit. The pre-sums anticipate the carry-in of the decimal positions and the need to perform six corrections after the carry-out signal of the highest decimal digit position has been generated. The carry-out signal of each decimal digit position is used in combination with operation control signals to select the correct pre-sum of the digit position.

12 Claims, 3 Drawing Sheets

COMBINED BINARY/DECIMAL ADDER UNIT

FIELD OF THE INVENTION

The invention relates to a combined binary/decimal adder unit for being used in computer systems for performing fast binary and decimal additions and subtractions with operands having a plurality of binary and decimal digit positions.

BACKGROUND OF THE INVENTION

Addition and subtraction of multi digit decimal operands are disclosed by the following publications: Hill and Patterson, "Digital Logic and Microprocessors" published by Wiley & Sons, New York 1984, pages 113–123; Omond, "Computer Arithmetic Systems, Algorithms, Architecture and Implementation", published by Prentice Hall, Englewood Cliffs, USA, 1994, pages 447–456; and Stein and Munro, "Introduction to Machine Arithmetic", Addison-Wesley Pulishing Company, Inc. New York 1971, pages 96–100. Such operations are performed by binary adding or subtracting groups of four binary digits each of which representing a decimal digit of the operand. Since each of these groups of four binary digits represents the decimal digits 0 . . . 9 and six invalid values A,B,C,D,E,F, correction operations are required to ensure a carry to the next higher digit position if X'9' is passed and to avoid that the result a decimal addition or subtraction includes digit positions having invalid values. In fast decimal adders such correction operations are performed in two operation cycles. In the first cycle a six correction value is added to each of the decimal digits of one of the operands in case of an addition. In the second operation cycle the raw sums generated during the first cycle are re-corrected if the result of the carry processing indicates that a correction was not necessary in a decimal digit position. For this purpose in each decimal digit position a carry-out signal of one is used to control a subtraction of six from the raw sum of the corresponding digit positions. In case of a subtraction a minus six correction is performed in the second cycle for each digit position if there is no carry-in in that position.

Thus, the known way to perform decimal additions and subtractions requires in each digit position three operations in a chain: first, a digitwise +6 operation if an addition is performed; second, a binary addition of both operands; and third, a conditional and digitwise −6 operation independent whether an addition or a subtraction is performed. This approach requires a propagation delay of 15 logical gate levels.

The time critical path of these operations resides in the highest decimal digit position for which the carry-in signal is generated at the end of the carry processing operation. Thus, the re-corrections of the sums and differences by the −6 operations require additional operation delay which limits cycle rate of the processor unit in which the decimal additions and subtraction have to be performed.

SUMMARY OF THE INVENTION

It is an object of the invention to reduce the operation delay of decimal additions and subtractions in a combined binary/decimal adder unit. Another object is to permit an increased cycle rate of the processor unit in which the combined binary/decimal adder unit is utilized. The invention is defined in the claims.

According to the invention pre-sums are generated for each decimal digit position in parallel to the generation and distribution of the carries over the total of decimal digit positions of the adder unit. The pre-sums anticipate the carry-in of the decimal positions and the need to perform six corrections after the carry signal of the highest decimal digit position has been generated. The carry-out signals of the decimal digit positions are used in combination with operation control signals to select the correct pre-sum as result of the addition or subtraction.

BRIEF DESCRIPTION OF THE DRAWINGS

In the following a preferred embodiment of a combined binary/decimal adder unit according to the invention is described with reference to accompanying drawings wherein.

DETAILED DESCRIPTION OF A PREFERRED EMBODIMENT OF THE INVENTION

Figure 1:
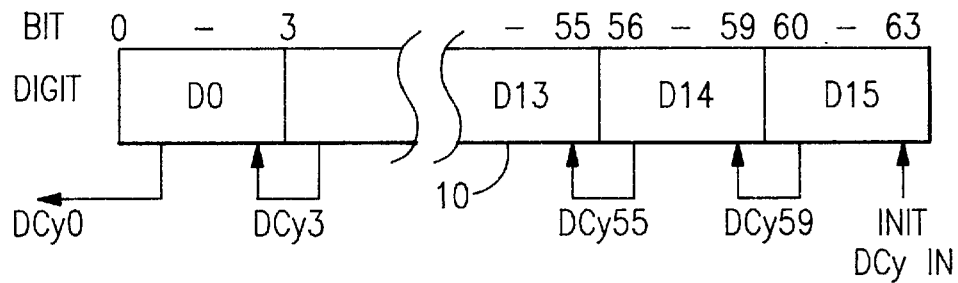
FIG. 1 shows a schematic block representation of the decimal digit positions of a combined binary/decimal adder unit.

A combined binary/decimal adder unit 10 shown in FIG. 1 contains 16 decimal digit positions D0–D15 each receiving one decimal digit of the operands A, B and generating one decimal digit of the result SUM. The unit 10 comprises 64 bit positions which are subdivided into 8 Bytes. Each byte is represented by two decimal digits consisting of 4 bits. Digit position D15 represents the least significant digit and digit position D0 represents the most significant digit. Each digit position receives a carry signal DCy-in from the next lower digit position and supplies a carry-out signal DCy-out to the next higher digit position. The least significant digit position receives an initial carry signal Init DCy_in which is 'one' if a subtraction has to be performed. For binary operations the decimal digit groups and the byte boundaries are ignored and the 64 bits of the unit represent 64 binary bit positions.

Figure 2:
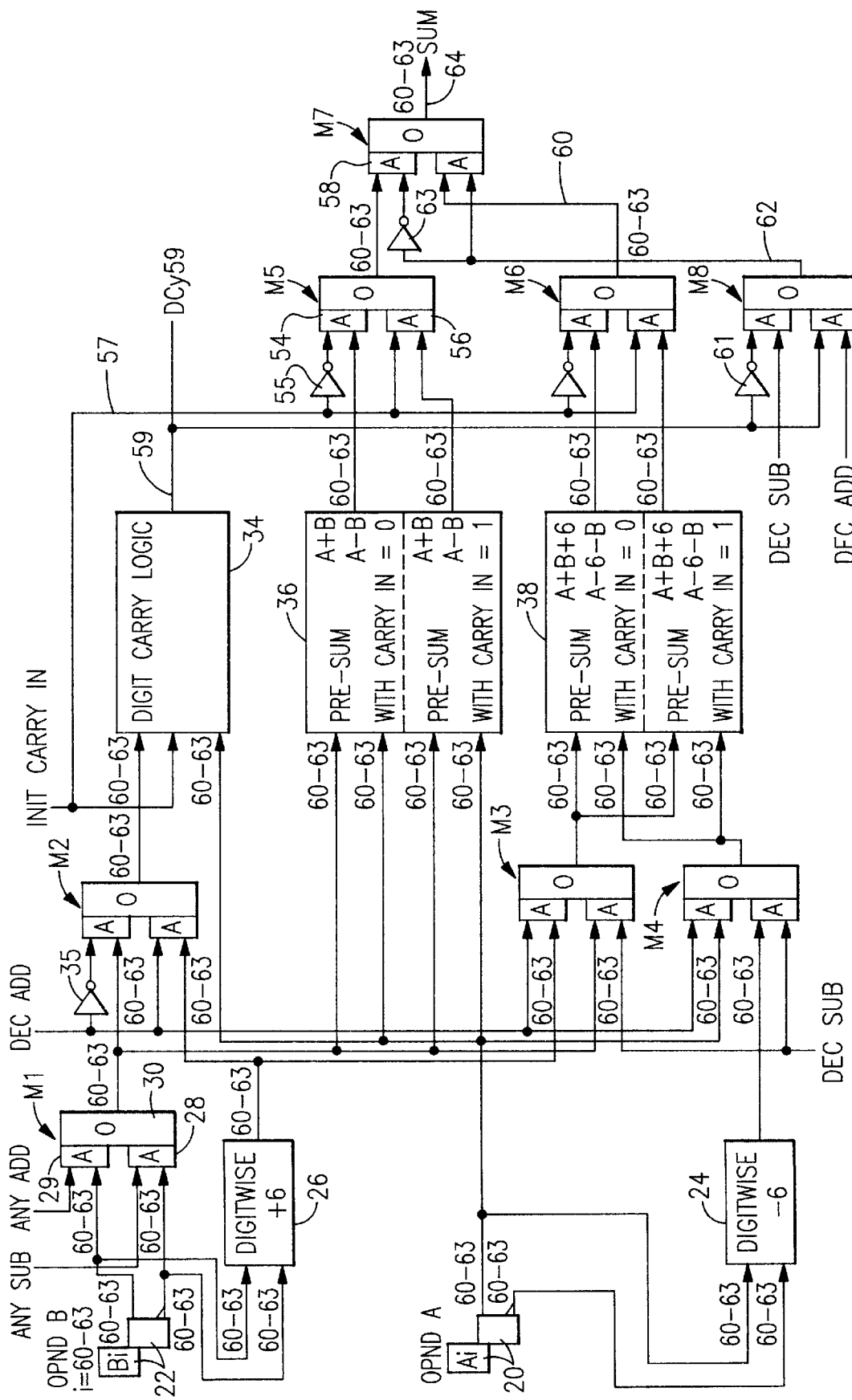
FIG. 2 shows a block diagram of the least significant digit position of a combined binary/decimal adder unit according to the invention.
Figure 3:
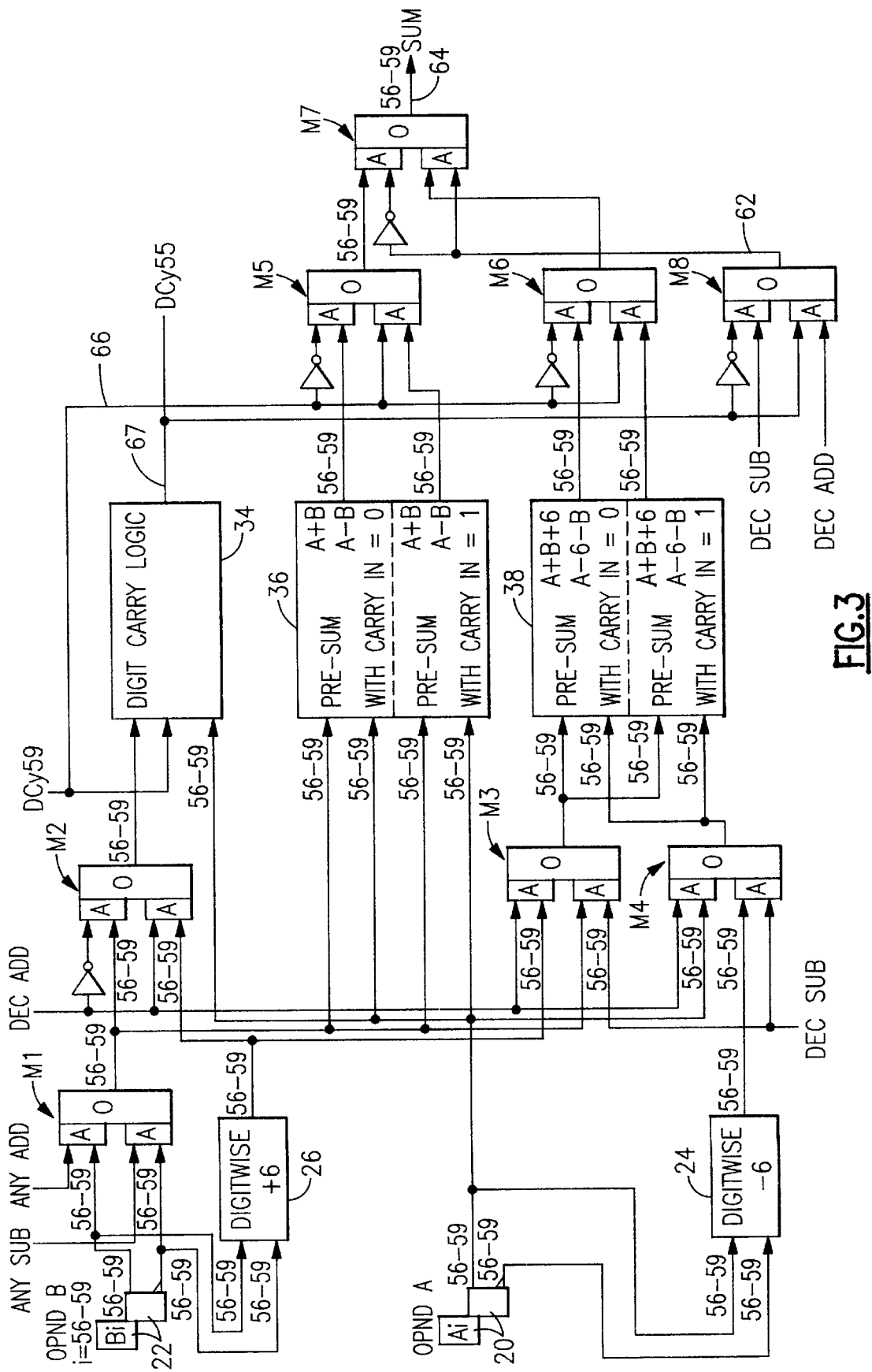
FIG. 3 shows a block diagram of the least but one significant digit position of the binary/decimal adder unit according to FIG. 2.

An implementation of two digit positions D15 and D14 is represented in FIGS. 2 and 3. FIG. 2 shows the least significant digit position which receives the lowest order digits of both operands A and B including bits 60–63 and which further receives an initial carry-in signal Init $DCy_{13}$ in.

The addition/subtraction is based on the following conventional rules:
Decimal ADD/SUB:

$Ai+Bi=Ai+6+Bi$ if $DCy\_out=1$ $Ai+Bi=(Ai+6+Bi)-6$ if $DCy\_out=0$ $Ai-Bi=Ai-Bi$ if $DCy\_out=1$ $Ai-Bi=(Ai-Bi)-6$ if $DCy\_out=0$ Binary ADD/SUB:

$Ai+Bi=Ai+Bi$ $$Ai-Bi=Ai-Bi$$

where i denotes the digit positions (0 . . . 15). The longest path through the logic is required for decimal additions/subtractions and includes:

one operand is digitwise incremented by +6, operands Ai, Bi are added/subtracted where the carry processing is most timing critical, depending on the carry-out of each digit, the result is digitwise decreased by −6.

According to the described embodiment of the invention the rules for the decimal addition/subtraction are modified as follows while the rules for the binary addition/subtraction remain as indicated above:

Decimal ADD/SUB:

$$Ai+Bi=Ai+Bi+6 \text{ if } DCy_{13} \text{ out}=1$$

$$Ai+Bi=Ai+Bi \text{ if } DCy_{13} \text{ out}=0$$

$$Ai-Bi=Ai-Bi \text{ if } DCy_{13} \text{ out}=1$$

$$Ai-Bi=Ai-6-Bi \text{ if } DCy_{13} \text{ out}=0$$

where these sums and differences are generated in parallel as pre-sums or pre-differences during the processing of the digit carries, and for each digit the digit carry DCy-out signal generated is used to select one of the pre-sums or pre-differences as the correct sum or difference.

In the embodiment according to FIG. 2 the bits 60–63 of the least significant digit of operand A are stored in a group of latches 20, and the corresponding bits 60–63 of operand B are stored in a group of latches 22 each of that groups of latches comprises a true output and an inverted output. A minus six logic 24 is connected to both outputs of the latches 20 to generate a −6 decrement of operand digit A. Similarly, a plus six logic 26 is connected to both outputs of the latches 22 to generate a +6 increment of operand digit B. Alternatively, the assignment of the minus six logic could be to operand Bi and assignment of the plus six logic could be to operand Ai. The logic circuits 24, 26 perform the six decrement and increment operations in a conventional manner by logical operations according to the following equations:

+6 logic:

DEC PLUS 6 BIT (3)=(3)

DEC PLUS 6 BIT (2)=(2)'

DEC PLUS 6 BIT (1)=((1) XOR (2))'

DEC PLUS 6 BIT (0)=(0)'*(1)+(0)'*(2)+(0)*(1)'*(2)'

−6 logic:

DEC MINUS 6 BIT (3)=(3)

DEC MINUS 6 BIT (2)=(2)'

DEC MINUS 6 BIT (1)=(1) XOR (2)

DEC MINUS 6 BIT (0)=(0)'*(1)'+(0)'*(2)'+(0)*(1)*(2)

wherein ' denotes the complement of the bit or term represented.

Figure 4:
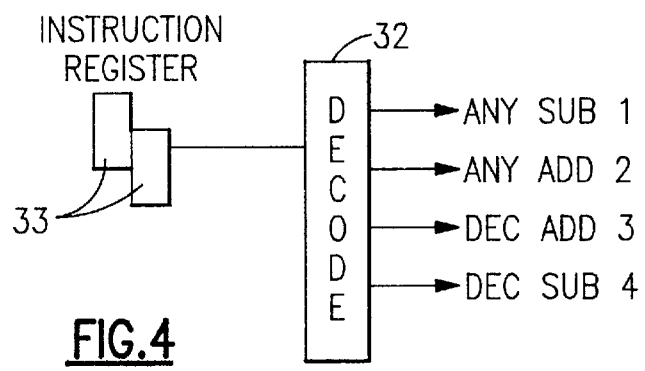
FIG. 4 shows a block diagram of an operation decoder as used in the unit of FIGS. 2 and 3.

The outputs of the latches 22 are also connected to a multiplexer M1 which consists of two AND-circuits 28, 29 followed by an OR-circuit 30. And-circuit 28 receives a control signals $ANY_{13}$ SUB together with the complement output of the latches 22, and AND-circuit 29 receives a control signal $ANY_{13}$ ADD together with the true output of the latches 22. The control signals $ANY_{13}$ SUB and $ANY_{13}$ ADD are generated by an operation decoder 32 which is connected to an instruction register 33 as shown in FIG. 4. The operation decoder supplies at a certain point of time either the control signals $ANY_{13}$ ADD or the control signal ANY_SUB but not both. The multiplexer M1 has four output lines assigned to the bits 60–63 for selectively gating the true operand B in case of additions or the complement of operand B in case of subtractions.

The output lines of the six increment logic 26 and of the multiplexer M1 are connected to a digit carry logic 34 through a four path multiplexer M2 the control inputs of which are connected to a control signal output DEC_ADD of OP-decoder 32 (shown in FIG. 4). In case of a decimal addition as indicated by a control signal $DEC_{13}$ ADD the incremented operand B is gated to the digit carry logic 34 while the absence of a signal DEC-ADD as indicated by inverter 35 controls a transfer of the true or complemented operand B from the output of multiplexer M1 to the digit carry logic 34. The digit carry logic 34 further receives the true bits 60–63 operand A from the latches 20. Another input of the digit carry logic 34 is the initial carry in signal $INIT_{13}$ $CARRY_{13}$ in.

The digit carry logic 34 generates a $DCy_{13}$ out signal of the digit position D15 to the bit position 59 (shown as DCy 59) of the digit position D14. The digit carry logic 34 operates according to the conventional carry look ahead concept by using generate functions Gi and propagate functions Pi of the operand bits where the generate function is the And-connection of the operand bits and the propagate function is the OR-connection of the operand bits:

Generate: Gi=Ai*Bi, propagate: Pi=Ai+Bi.

The logic operations performed by the digit carry logic 34 of the least significant decimal digit position are the following:

$$DCy\_out=G0+G1*P0+G2*P0*P1+G3*P0*P1*P2+ P0*P1*P2*P3*Cy_{13} \text{ in}$$

wherein Cy_in is the carry into the least significant digit position also called unit-in carry or initial carry $INIT_{13}$ $CARRY_{13}$ in and is used to generate the 2's complement for the performing of subtractions.

The output lines of the circuits 20, 24, 26 and M1 are further connected either directly or through multiplexers M3 and M4 to a pre-sum logic consisting of pre-sum logic circuits 36 and 38. Pre-sum logic circuit 36 generates from the operand bits the preliminary results A+B and A−B on the assumption that the carry input of this digit position is zero ($DCy_{13}$ in=0), and further generates the preliminary results Ai+Bi and Ai−Bi on the assumption that the carry input of this digit position is one ($DCy_{13}$ in=1). Similarly, pre-sum logic circuit 38 generates from the operand bits of the same decimal digit position the preliminary results Ai+Bi+6 and Ai−6−Bi on the assumption that the carry input of this digit position is zero ($DCy_{13}$ in=0) and the preliminary results Ai+Bi+6 and Ai−6−Bi on the assumption that the carry input of this digit position is one ($DCy_{13}$ in=1).

For this purpose pre-sum logic circuit 36 receives from the latches 20 the bits of the true operand A and from multiplexer M1 the true or complemented bits of the operand B. Pre-sum logic circuit 38 receives from multiplexer M1 through the four path multiplexer M3 the complemented bits of the operand B if OP-decoder 32 delivers a $DEC_{13}$ SUB signal, and receives from the plus six logic 26 the incremented operand B through the multiplexer M3 if OP-decoder 32 delivers a $DEC_{13}$ ADD signal. Pre-sum logic circuit 38 further receives through the four path multiplexer M4 the bits of the true operand A if OP-decoder 32 delivers a $DEC_{13}$ ADD signal and from the minus six logic 24 the decremented operand B if OP-decoder 32 delivers a $DEC_{13}$ SUB signal.

Figure 5:
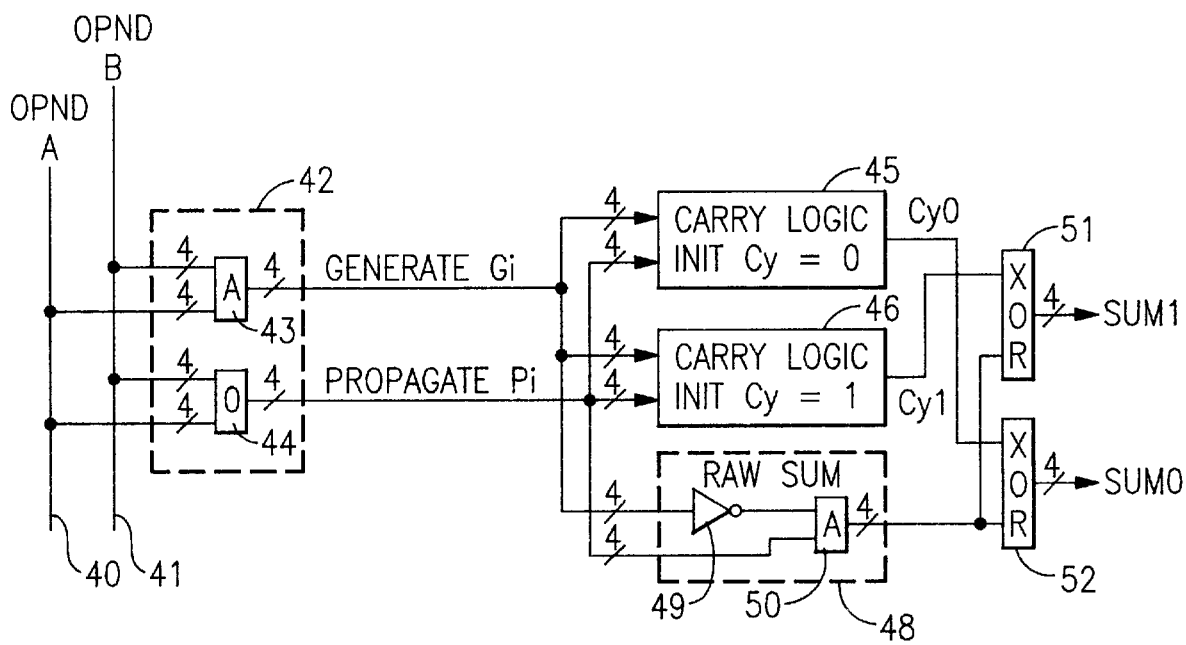
FIG. 5 shows a block diagram of a pre-sum logic as used in the unit of FIGS. 2 and 3.

FIG. 5 shows an implementation of the pre-sum logic circuits 36, 38 of FIG. 2 wherein only one of the pre-sum logic circuits 36, 38 is shown since both circuits 36 and 38 are identical. Via 4 wire input lines 40, 41 the pre-sum-logic circuit 36 or 38 receives the operands A and B as described above, i.e. the bits of the true, complemented, incremented or decremented operands. From these input signals a bit function circuit 42 produces the generate functions Gi by means of AND-circuits 43 and the propagate functions Pi by means of OR-circuits 44. Both sets of bit functions are supplied to carry logic circuits 45 and 46 and to a raw sum logic 48. The carry logic circuit 45 performs the carry processing in the digit position shown on the assumption that the $DCy_{13}$ in signal is zero by implementing the following operations using the generate and propagate functions Gi and Pi as supplied by circuit 42:

$Cy3=0$ $Cy2=G3$ $Cy1=G2+G3*P2$ $Cy0=G1+G2*P1+G3*P1*P2$

Accordingly, the carry logic circuit 46 performs the carry processing on the assumption that the $DCy_{13}$ in signal is one by implementing the following operations:

$Cy3=1$ $Cy2=P3$ $Cy1=G2+P2*P3$ $Cy0=G1+G2*P1+P1*P2*P3$

The raw sum logic 48 implements the EXCLUSIVE OR function of the operands A and B as received on the lines 40, 41 by inverter circuits 49 and AND-circuits 50 for inverting the generate functions Gi and AND-connecting the Pi functions and the inverted Gi functions as follows:

$Ai\ xor\ Bi=Ai*Bi'+Ai'*Bi=(Ai*Bi)'*(Ai+Bi)=Gi'*Pi$ wherein i denotes the bits of the digit position and ' denotes the complement of the designated term.

Two XOR-circuits 51, 52 combine the outputs of the carry logic circuits 45, 46 and the outputs of the raw sum logic 48 to generate SUM0 and SUM1 of the digit position where SUM0 is based on the assumption that the DCy_in signal is zero and SUM1 is based on the assumption that the $DCy_{13}$ in signal is one.

As shown in FIG. 2 the pre-sum logic circuits 36 and 38 are arranged in parallel among each other and in parallel with the digit carry logic 34. Thus, these three circuits operate simultaneously in generating the digit carry and the pre-sums Ai+Bi or Ai−Bi with and without a carry-in and the pre-sums Ai+Bi+6 or Ai−6−Bi with and without a carry-in. During the corresponding operations in the digit positions of unit 10 the total time requirements of the digit carry logic circuits of all 16 digit positions is the critical factor for the operation speed of the unit 10. The carry out of a digit position, as soon it is available, is used to select one of the pre-sums as the correct sum of the next higher digit position. In the least significant digit position this selection depends on the initial carry-in signal $INIT_{13}$ CARY-in. The pre-sum selection is performed by means of multiplexer M5–M8. An AND-circuit 54 of the Multiplexer M5 receives from pre-sum logic circuit 36 the bits of the pre-sums Ai+Bi or Ai−Bi generated on the assumption that the DCy_in signal is zero, and an AND-circuit 56 receives from pre-sum logic circuit 36 the bits of the pre-sums Ai+Bi or Ai−Bi generated on the assumption that the $DCy_{13}$ in signal is one. The initial carry signal $INIT_{13}$ $CARRY_{13}$ in on line 57 selects one of these pre-sums. AND-circuit 54 receives its control signal from an inverter circuit 55 which inverts initial carry signal $INIT_{13}$ $CARRY_{13}$ in to gate the pre-sum Ai+Bi or Ai−Bi generated on the assumption that the $DCy_{13}$ in signal is zero to the output lines 58 of the multiplexer M5. An AND-circuit 56 is directly controlled by the initial carry signal $INIT_{13}$ $CARRY_{13}$ in to gate the pre-sum Ai+Bi or Ai−Bi generated on the assumption that the DCy_in signal is one to the output lines 58.

Multiplexer M6 is similarly connected to the output of the pre-sum logic circuit 38 to gate to its output lines 60 either the pre-sum Ai+Bi+6 or Ai−6−Bi generated on the assumption that the $DCy_{13}$ in signal is zero or the pre-sum Ai+Bi+6 or Ai−6−Bi generated on the assumption that the $DCy_{13}$ in signal is one. The lines 58 and 60 form the input of multiplexer M7 which selects the output of multiplexer M5 or the output of multiplexer M6 as the correct sum or difference. This selection depends on the signal DCy from the digit carry logic 34 and the active operation control signal. The signal DCy is the carry-out signal of the least significant digit position which is transferred via line 59 to multiplexer M8 and to the next higher digit position. Multiplexer M8 receives from the OP-decoder 32 the control signals $DEC_{13}$ ADD and $DEC_{13}$ SUB and generates a select signal on its output line 61 if the signal DCy is one and a $DEC_{13}$ ADD signal is present and if the signal DCy is zero and a $DEC_{13}$ SUB signal is present. In order to implement the latter case the M8 input controlled by $DEC_{13}$ SUB contains an inverter circuit 61 which generates the complement of the signal DCy. The select signal on line 62 is used to gate the output of multiplexer M6 as correct SUM of the least significant digit position to the unit output 64. The complement of the select signal generated by inverter circuit 63 is used to gate the output of multiplexer M5 as correct SUM to the unit output 64. The select function described terminates the decimal addition or subtraction operation without any need of a further +/− six correction.

FIG. 3 shows the next higher digit position D14 of the unit 10 and corresponds to the digit position D15 shown in the FIG. 2. In FIG. 3 components which correspond to components shown in FIG. 2 carry the same reference signs but are designated with the bit positions 56–59 of digit position D14. In FIG. 3 the digit carry-in signal DCy59 from line 59 of FIG. 2 is transferred via line 66 to the multiplexer M5 and M6 to select the pre-sums generated in digit position D14. The output of the digit carry logic 34 of digit position D14 appears on line 67 which leads to multiplexer M8 and to the bit position DCy55 of digit position D13.

The pre-sum selection operation performed by means of the carry signals DCy(15 . . . 0) in each of the digit positions starts with the availability of the carry-in signal DCy59 and will be completed when the carry-out signal DCy0 of the most significant digit position D0 has been generated.

With regard to the binary addition and subtraction it is noted that these operations are exclusively controlled by the control signals $ANY_{13}$ ADD, $ANY_{13}$ SUB. In these cases the control signals $DEC_{13}$ ADD, $DEC_{13}$ SUB do not appear and the circuits 24, 26, 38 and the multiplexers M3, M4, M6 and M8 have no function.

While the invention is described with reference to a preferred embodiment deviations, modifications or other embodiments of the invention are within the scope of the invention as defined by the annexed claims.

We claim:

1. A combined binary/decimal adder unit (10) comprising a sum logic for generating a binary rough sum of each decimal digit of a plurality of operands, a digit carry logic (34) for generating binary carries within the decimal digits and carries out of the decimal digits, and a correction logic performing a six correction of decimal sum digits which are in the invalid range, the adder unit characterized by:
   (a) a first correction logic (26) for adding a plus six correction value to each decimal digit of a first one of the operands;
   (b) a second correction logic (24) for adding a minus six correction value to each decimal digit of a second one of the operands;
   (c) a pre-sum logic (36, 38) for receiving the output of the first correction logic and receiving said first one of said operands in an uncorrected state and for receiving the output of the second correction logic and receiving the second one of said operands in an uncorrected state and for generating in each position of the decimal digits a first set of sums of the corrected and uncorrected operands under the presumption of a zero carry input into the decimal digit position and a second set of sums of corrected and uncorrected operands under the presumption of a one carry input into the decimal digit position; and
   (d) a selection logic (M5–M8) operating in response to a digit carry-in signal ($INIT_{13}$ $CARRY_{13}$ in, DCy59), to carry-out signals from the digit carry logic (34) and to an operation control signal ($DEC_{13}$ ADD, $DEC_{13}$ SUB) for selecting one of the pre-sums from the first or second set of sums as the correct sum of the decimal digit position.

2. An adder as recited in claim 1, wherein said pre-sum logic (36, 38) is arranged in parallel to said digit carry logic (34) and provides its outputs simultaneously with said digit carry logic.

3. An adder as recited in claim 1, wherein said pre-sum logic comprises:
   (c1) a first pre-sum logic circuit (36) for generating a sum or difference of the uncorrected operands in each of the decimal positions under the presumption of a zero carry input into the decimal position and a sum or difference of the uncorrected operands in each of the decimal positions under the presumption of a one carry input into the decimal position;
   (c2) a second pre-sum logic circuit (38) for generating a sum or difference of the six corrected operands in each of the decimal positions under the presumption of a zero carry input into the decimal position and a sum or difference of the six corrected operands in each of the decimal positions under the presumption of a one carry input into the decimal position; and
   wherein said selection logic (M5–M8) is arranged for selecting one of the pre-sums generated by the first and second pre-sum logic circuits as the correct sum or difference.

4. An adder as recited in claim 3, wherein said selection logic comprises
   (d1) a first multiplex circuit (M5) assigned to the output of said first pre-sum logic circuit (36) and responding to a digit carry in signal ($INIT_{13}$ CARRY-in, DCy59) to select a pre-sum of uncorrected operands generated under the presumption of a one carry input into the decimal position, and responding to the complement of a digit carry in signal ($INIT_{13}$ CARRY-in, DCy59) to select a pre-sum of uncorrected operands generated under the presumption of a zero carry input into the decimal position; and
   (d2) a second multiplex circuit (M6) assigned to the output of said second pre-sum logic circuit (38) and responding to a digit carry in signal ($INIT_{13}$ CARRY-in, DCy59) to select a pre-sum of corrected operands generated under the presumption of a one carry input into the decimal position, and responding to the complement of a digit carry in signal ($INIT_{13}$ CARRY-in, DCy59) to select a pre-sum of corrected operands generated under the presumption of a zero carry input into the decimal position.

5. An adder as recited in claim 4, wherein said selection logic comprises
   (d3) a third multiplex circuit (M7) connected to the outputs of said first and second multiplex circuits (M5, M6) to distinguish between the pre-sums gated by said multiplex circuits (M5, M6) in response to the output of said digit carry logic (34) and said operation control signal ($DEC_{13}$ ADD, $DEC_{13}$ SUB),
      where a zero output of said digit carry logic (34) with an add operation control signal (DEC_ADD) or a one output of said digit carry logic (34) with a subtract operation control signal (DEC_SUB) selects the pre-sum of uncorrected operands, and
      where a one output of said digit carry logic (34) with an add operation control signal ($DEC_{13}$ ADD) or a zero output of said digit carry logic (34) with a subtract operation control signal ($DEC_{13}$ SUB) selects the pre-sum of corrected operands.

6. An adder as recited in claim 3, wherein said pre-sum logic comprises a bit function circuit (42) generating from the binary digits of the decimal digit position a generate function (Gi) and a propagate function (Pi), said bit functions are used by a bit carry logic (45, 46) and a raw sum logic (48) to generate a pre-sum.

7. An adder as recited in claim 6, wherein said bit carry logic comprises a first bit carry circuit (45) which operates with a digit carry-in signal of zero and a second bit carry circuit (46) which operates with an digit carry-in signal of one.

8. An adder as recited in claim 6, wherein said raw sum logic (48) includes a circuit (49, 50) for performing AND connections of the propagate functions (Pi) and the complemented generate functions (Gi).

9. An adder as recited in claim 6, wherein said pre-sum logic comprises circuits (51, 52) for connecting the output of the raw sum logic (48) with the outputs of said bit carry logic (45, 46) to generate two pre-sums (SUM1 and SUM0).

10. An adder as recited in claim 1, comprising an operand modification logic (M1–M4) which determines the input of the digit carry logic (34) and of the pre-sum logic (36, 38) by selecting the true operands (A, B), the complement of one of the operands (B) and the six corrected operands (A–6 or B+6) and gating the selected operands to the digit carry logic (34) and the pre-sum logic (36, 38).

11. An adder as recited in claim 10, wherein said operand modification logic comprises a first multiplex circuit (M1) controlled by addition and subtraction control signals (ANY- ADD, $ANY_{13}$ SUB) for selecting the true operand (B) or its complement, a second multiplex circuit (M2) controlled by decimal addition control signals (DEC_ADD) for gating the true operand (B) or its complement or the +6 corrected operand (B) to said digit carry logic (34), and third and fourth multiplex circuits (M3, M4) controlled by decimal addition and said subtraction control signals ($DEC_{13}$ ADD, $DEC_{13}$ SUB) for gating the true operand (B) or its complement, the true operand (A), the +6 corrected operand (B) and/or the −6 corrected operand (A) to said pre-sum logic (36, 38).

12. An adder as recited in claim 1, wherein said digit carry logic (34) is a carry-look ahead adder.

* * * * *